United States Patent
Kim et al.

(10) Patent No.: US 9,775,192 B2
(45) Date of Patent: Sep. 26, 2017

(54) METHOD AND APPARATUS FOR SHARING WIRELESS DATA SERVICE

(75) Inventors: Cheol-hoi Kim, Seoul (KR); Hun Lee, Seoul (KR); Ji-hoon Choi, Seoul (KR); Joo-yoon Bae, Seoul (KR)

(73) Assignee: Samsung Electronics Co., Ltd (KR)

( * ) Notice: Subject to any disclaimer, the term of this patent is extended or adjusted under 35 U.S.C. 154(b) by 88 days.

(21) Appl. No.: 13/221,496

(22) Filed: Aug. 30, 2011

(65) Prior Publication Data
US 2012/0057579 A1    Mar. 8, 2012

(30) Foreign Application Priority Data
Sep. 7, 2010 (KR) .................. 10-2010-0087661

(51) Int. Cl.
*H04W 88/04* (2009.01)
*H04W 84/14* (2009.01)
*H04W 88/06* (2009.01)

(52) U.S. Cl.
CPC ............ *H04W 88/04* (2013.01); *H04W 84/14* (2013.01); *H04W 88/06* (2013.01)

(58) Field of Classification Search
CPC ......... H04W 84/22; H04W 4/24; H04W 4/26; H04W 8/186; H04W 8/18; H04W 88/04;
(Continued)

(56) References Cited

U.S. PATENT DOCUMENTS 7,734,293 B2 * 6/2010 Zilliacus et al. ............... 455/445
7,831,199 B2 * 11/2010 Ng et al. ...................... 455/3.06
(Continued)

FOREIGN PATENT DOCUMENTS

EP          1 768 323        3/2007
KR       1020040087214      10/2004
(Continued)

OTHER PUBLICATIONS

Chinese Office Action dated Aug. 5, 2015 issued in counterpart application No. 201180043087.5, 11 pages.
(Continued)

*Primary Examiner* — Ian N. Moore
*Assistant Examiner* — Latresa McCallum
(74) *Attorney, Agent, or Firm* — The Farrell Law Firm, P.C.

(57) ABSTRACT

A method of sharing a wireless data service, including receiving, by a first terminal, a wireless data service share request from a second terminal, checking, by the first terminal, available wireless data service remaining amount information, and transmitting, by the first terminal, a response to the wireless data service share request to the second terminal based on the checked wireless data service remaining amount information. Another such sharing method includes requesting, by a second terminal, wireless data service remaining amount information available by a first terminal from the first terminal, transmitting, by the second terminal, a wireless data service share request to the first terminal based on the wireless data service remaining amount information received from the first terminal, and receiving, by the second terminal, a response to the wireless data service share request from the first terminal.

8 Claims, 4 Drawing Sheets

(58) Field of Classification Search
CPC ..... H04W 84/14; H04W 88/06; H04M 15/07; H04M 15/46; H04M 15/745; H04M 15/765; H04M 15/781; H04M 15/783
See application file for complete search history.

(56) References Cited

U.S. PATENT DOCUMENTS

| | | | |
|---|---|---|---|
| 8,180,898 B2* | 5/2012 | Bitterlich | 709/227 |
| 8,532,611 B2* | 9/2013 | Kotzin | 455/406 |
| 2005/0041673 A1* | 2/2005 | Jiang | H04L 47/10 370/401 |
| 2005/0084081 A1* | 4/2005 | Manto | H04M 15/08 379/114.05 |
| 2006/0090202 A1* | 4/2006 | Liu et al. | 726/17 |
| 2006/0276180 A1* | 12/2006 | Henry et al. | H04M 15/00 455/412.2 |
| 2007/0026857 A1 | 2/2007 | Kotzin | |
| 2007/0072597 A1* | 3/2007 | Peuziat et al. | 455/418 |
| 2007/0147324 A1 | 6/2007 | McGary | |
| 2007/0149173 A1* | 6/2007 | Jeon | 455/411 |
| 2007/0286125 A1* | 12/2007 | Lee et al. | 370/331 |
| 2008/0109852 A1 | 5/2008 | Kretz et al. | |
| 2009/0074083 A1* | 3/2009 | Wakutsu | 375/240.28 |
| 2009/0144435 A1 | 6/2009 | Naniyat | |
| 2009/0180395 A1* | 7/2009 | Wood | H04L 43/045 370/252 |
| 2009/0287922 A1* | 11/2009 | Herwono et al. | 713/155 |
| 2010/0144368 A1 | 6/2010 | Sullivan et al. | |
| 2010/0188998 A1* | 7/2010 | Pernu | H04L 41/0806 370/252 |
| 2011/0294502 A1* | 12/2011 | Oerton | 455/426.1 |

FOREIGN PATENT DOCUMENTS

| | | |
|---|---|---|
| KR | 1020060072905 | 6/2006 |
| KR | 1020100006325 | 1/2010 |
| KR | 1020100026294 | 3/2010 |
| WO | WO 2007/023161 | 3/2007 |

OTHER PUBLICATIONS

Korean Office Action dated Nov. 15, 2016 issued in counterpart application No. 10-2010-0087661, 11 pages.
European Search Report dated Jun. 8, 2017 issued in counterpart application No. 11823716.3-1870, 8 pages.

* cited by examiner

METHOD AND APPARATUS FOR SHARING WIRELESS DATA SERVICE

PRIORITY

This application claims priority under 35 U.S.C. 119 to Korean Patent Application No. 10-2010-0087661, filed on Sep. 7, 2010, in the Korean Intellectual Property Office, the contents of which are incorporated herein by reference.

BACKGROUND OF THE INVENTION

1. Field of the Invention

The present invention relates generally to a method and apparatus for sharing a wireless data service, and more particularly, to a method and apparatus for sharing a wireless data service accessible by a connected external terminal.

2. Description of the Related Art

Charges for a wireless data service, such as the Internet, using a cellular phone are generally incurred based on data packets used by users. Fixed billing rates have recently provided an amount of data packets without additional charges. In this case, if an amount of used data packets exceeds a limit, wireless data service providers have charged for additional data packets in a packet unit.

As Internet services extend, a Wi-Fi Third Generation (3G) dithering technology uses Internet in a Wide Area Network (WAN) environment by connecting devices in which no wireless modem is embedded to a device in which wireless modems are embedded through Wi-Fi interfaces. According to the Wi-Fi 3G dithering technology, when devices in which no wireless modem is embedded attempt to access a wireless network of a service provider, the Internet is accessible by connecting devices in which no wireless modem is embedded to devices in which wireless modems are embedded through Wireless Fidelity (Wi-Fi).

For example, devices in which no wireless modem is embedded and LAN interfaces are provided, such as an electronic frame, an e-book, or a tablet device, are connected to devices in which wireless modems are embedded through a Local Area Network (LAN), and transmit data packets received through wireless modems through the LAN to use the Internet in the WAN environment.

However, a problem in the art persists in that a wireless data service is not shared when an amount of remaining data is insufficient to use the wireless data service.

SUMMARY OF THE INVENTION

The present invention provides a method and apparatus for sharing a wireless data service accessible by an external terminal by connecting the external terminal capable of accessing the wireless data service to a network if an amount of remaining data is not enough to use the wireless data service.

According to an aspect of the present invention, there is provided a method of sharing a wireless data service, the method including receiving, by a first terminal, a wireless data service share request from a second terminal, checking, by the first terminal, available wireless data service remaining amount information, and transmitting, by the first terminal, a response to the wireless data service share request to the second terminal based on the checked wireless data service remaining amount information.

The method may further include connecting the first terminal and the second terminal through a wireless LAN.

The method may further include receiving, by the first terminal, a data request from the second terminal, receiving, by the first terminal, the requested data within the available wireless data service remaining amount from the server through the cellular network, and transmitting, by the first terminal, the received data to the second terminal.

According to another aspect of the present invention, there is provided a method of sharing a wireless data service, including requesting, by a second terminal, wireless data service remaining amount information available by a first terminal from the first terminal, transmitting, by the second terminal, a wireless data service share request to the first terminal based on the wireless data service remaining amount information received from the first terminal. and receiving, by the second terminal, a response to the wireless data service share request from the first terminal.

The method may further include requesting for, by the second terminal, data from the first terminal, and receiving, by the second terminal, data that is received by the first terminal through the cellular network from the first terminal.

The method may further include, if the first terminal completely consumes the available wireless data service remaining amount, transmitting, by the second terminal, the wireless data service share request to a terminal having the greatest available wireless data service remaining amount among the at least one terminal excluding the first terminal.

According to another aspect of the present invention, there is provided an apparatus for sharing a wireless data service, including a controller for receiving a wireless data service share request from an external terminal, and a wireless modem for checking available wireless data service remaining amount information, wherein the controller transmits a response to the wireless data service share request to the external terminal based on the checked wireless data service remaining amount information.

According to another aspect of the present invention, there is provided an apparatus for sharing a wireless data service, including a controller for requesting wireless data service remaining amount information available by an external terminal from the external terminal, transmitting a wireless data service share request to the external terminal based on the available wireless data service remaining amount information received from the external terminal, and receiving a response to the wireless data service share request from the external terminal.

BRIEF DESCRIPTION OF THE DRAWINGS

The above and other features and advantages of the present invention will become more apparent by describing in detail embodiments thereof with reference to the attached drawings, in which.

DETAILED DESCRIPTION OF EMBODIMENTS OF THE INVENTION

Hereinafter, the present invention will be described in detail by explaining embodiments of the invention with reference to the attached drawings.

Figure 1:
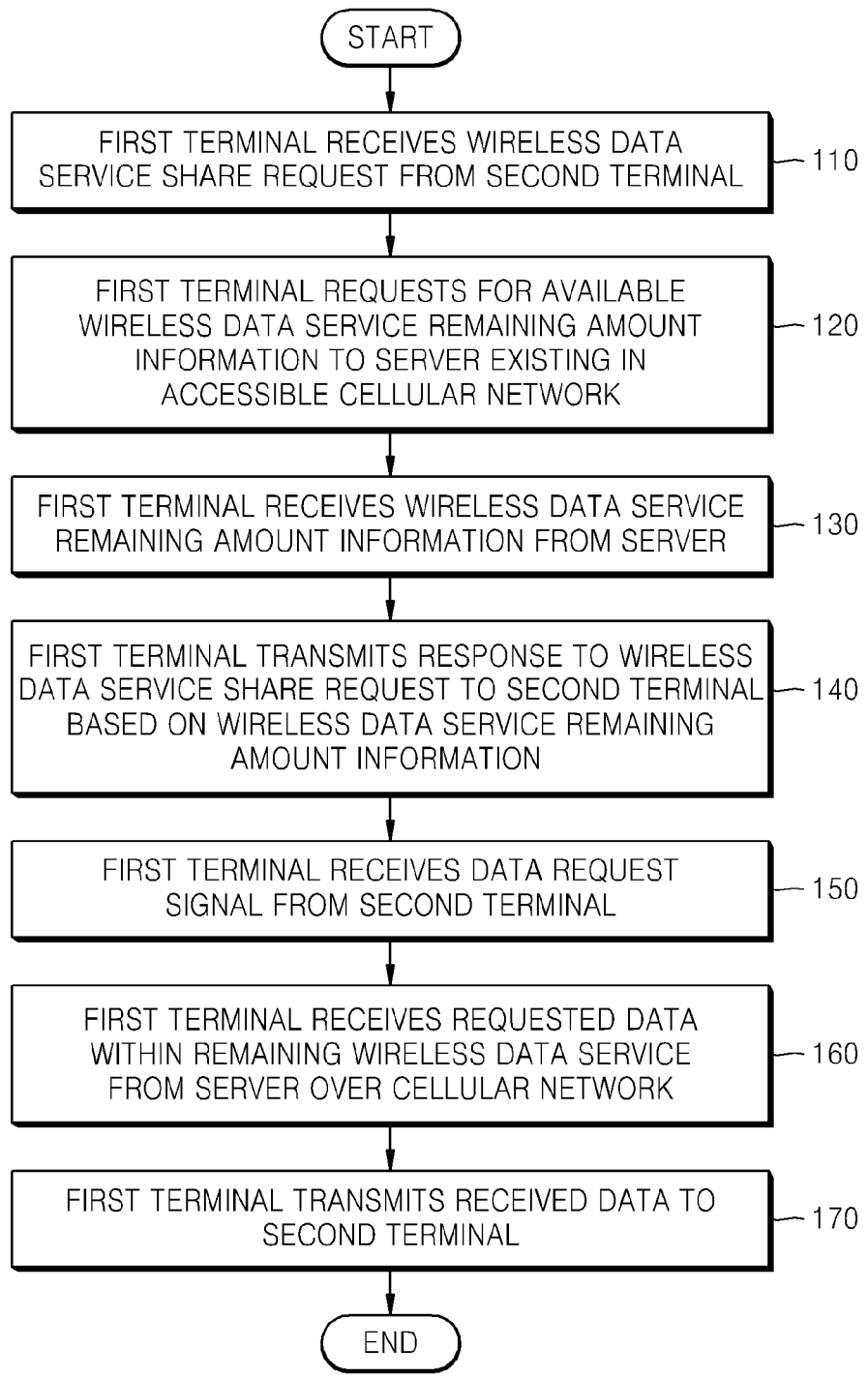
FIG. 1 illustrates a method of sharing a wireless data service, according to a first embodiment of the present invention.

FIG. 1 illustrates a method of sharing a wireless data service, according to a first embodiment of the present invention.

Referring to FIG. 1, in step 110, a first terminal receives a wireless data service sharing request from a second terminal. The wireless data service denotes a service that the first terminal or the second terminal uses a data service, such as the Internet, provided by a cellular network via a cellular interface. The cellular network may be configured based on various cellular communication technologies including 3G and Fourth Generation (4G). Communication means is not limited to the cellular network. The first terminal receives a request for the second terminal to use the data service provided by the cellular network through the first terminal, from the second terminal. The wireless data service share request of the present embodiment includes a wireless data service remaining amount information request of the first terminal. Wireless data service remaining amount information will be described later herein.

In step 120, the first terminal requests for available wireless data service remaining amount information to a server existing in an accessible cellular network. The available wireless data service remaining amount information indicates a physical amount of remaining data packets available without an additional charge, excluding an amount of currently used data packets, with respect to a fixed billing rate of the wireless data service available by a terminal through the cellular network. The available wireless data service remaining amount information may indicate a time available without an additional charge, excluding a currently used time, with respect to the fixed billing rate of the wireless data service available by the terminal through the cellular network. The server existing in the accessible cellular network is of a service provider of the wireless data service.

In step 130, the first terminal receives the wireless data service remaining amount information from the server.

In step 140, if the wireless data service remaining amount remains in the first terminal, the first terminal transmits a response to the wireless data service share request to the second terminal. If the second terminal receives the response to the wireless data service share request from the first terminal, the first terminal and the second terminal are connected through a wireless LAN and maintain communication therebetween. The wireless lAN is used to access the Internet within a distance from an Access Point (AP), and may be Wi-Fi. However, connection between the first terminal and the second terminal is not limited to the wireless LAN. The first terminal and the second terminal may maintain connection and communicate data therebetween.

In step 150, the first terminal receives a data request signal from the second terminal. Requested data indicates data downloadable by the first terminal by using the wireless data service through the cellular network.

In step 160, the first terminal receives the requested data from the server of the service provider through the cellular network. However, the first terminal may request for the requested data within the remaining wireless data service from the server and receive the requested data from the server.

In step 170, the first terminal transmits the data received from the server to the second terminal.

Figure 2:
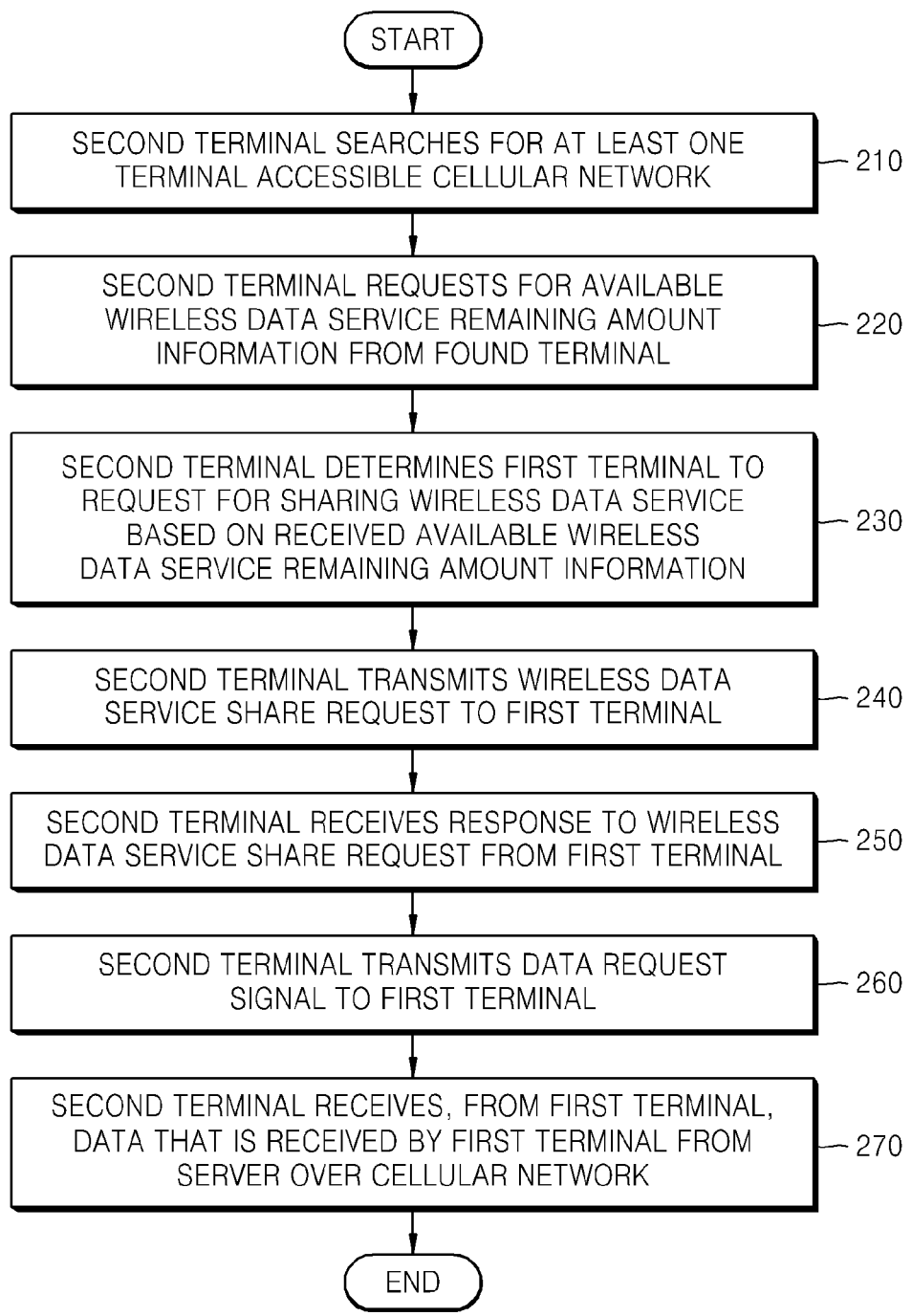
FIG. 2 illustrates a method of sharing a wireless data service, according to a second embodiment of the present invention.

FIG. 2 illustrates a method of sharing a wireless data service, according to a second embodiment of the present invention.

Referring to FIG. 2, in step 210, a second terminal searches for at least one terminal accessible a cellular network. The second terminal may or may not use the wireless data service through the cellular network. If the second terminal includes a modem accessible the wireless data service through the cellular network, the second terminal may periodically query a server of a service provider about an amount of remaining wireless data service, i.e., service data remaining packets while using the wireless data service. If an amount of currently used data exceeds the limit of a fixed billing rate, the second terminal stops using the wireless data service.

Thereafter, the second terminal searches for terminals including wireless modems accessible the cellular network. For example, the second terminal searches for mobile devices including wireless modems that are regarded as having no speed problem for access to the Internet based on a Received Signal Strength Indication (RSSI) reception intensity. The wireless data service and available wireless data service remaining amount information are the same as described with respect to FIG. 1.

In step 220, the second terminal requests for the available wireless data service remaining amount information from the found terminal. That is, the second terminal requests for an inquiry of remaining data packets accessible the wireless data service from the found terminal.

In step 230, the second terminal receives the available wireless data service remaining amount information from the found terminal, and determines a first terminal to request for sharing the wireless data service based on the received available wireless data service remaining amount information. In the second embodiment, the second terminal determines a terminal having the greatest amount of remaining wireless data service as the first terminal.

In step 240, the second terminal transmits a wireless data service share request to the first terminal.

In step 250, the second terminal receives a response to the wireless data service share request from the first terminal. Thereafter, the first terminal and the second terminal are connected through a wireless LAN and maintain communication therebetween. The description of the wireless LAN is the same as described with respect to FIG. 1.

In step 260, the second terminal transmits a data request signal to the first terminal. Requested data indicates data downloadable by the first terminal by using the wireless data service through the cellular network.

In step 270, the second terminal receives, from the first terminal, data that is received by the first terminal from the server of the service provider through the cellular network.

If the first terminal completely consumes the amount of remaining wireless data service by sharing the wireless data service, the second terminal determines the terminal having the greatest amount of remaining wireless data service as a terminal to share the wireless data service, except the first terminal, among the found terminals, and returns to step 240.

Figure 3:
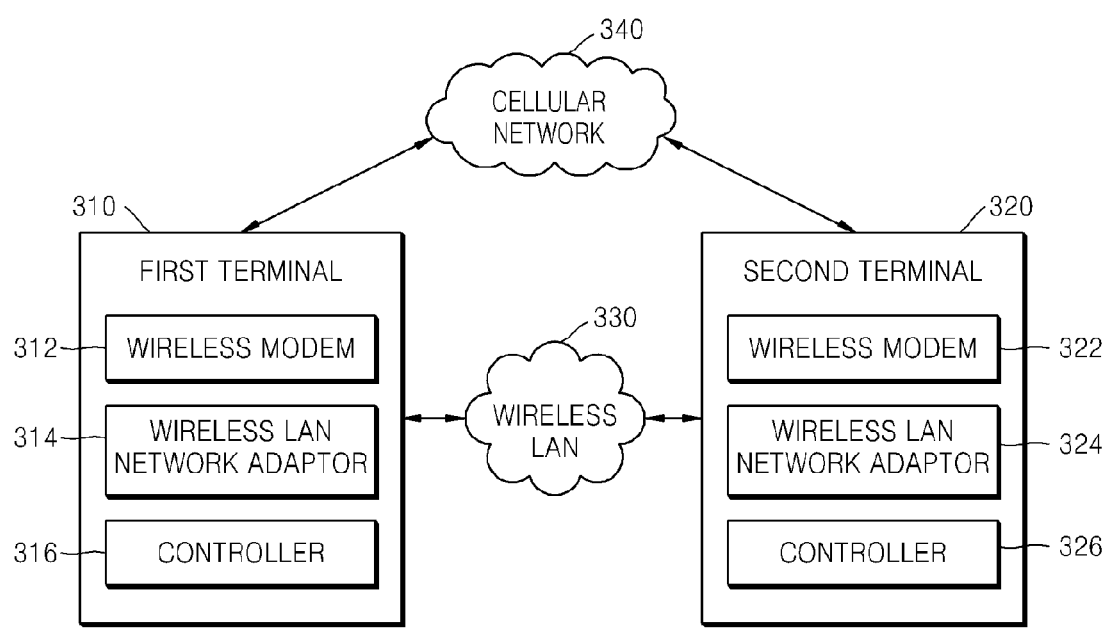
FIG. 3 illustrates an apparatus for sharing a wireless data service, according to the present invention.

FIG. 3 illustrates an apparatus for sharing a wireless data service, according to the present invention.

Referring to FIG. 3, a first terminal 310 includes a wireless modem 312, a wireless LAN network adaptor 314, and a controller 316, and a second terminal 320 includes a wireless modem 322, a wireless LAN network adaptor 324, and a controller 326. The first terminal 310 and the second terminal 320 may use a data service such as the Internet, provided by a cellular network 340 via respective cellular interfaces, such as the wireless modems 312 and 322. The cellular network 340 may be configured based on various cellular communication technologies including 3G and 4G. In FIG. 3, it is assumed that the first terminal 310 is requested to share the wireless data service, and the second terminal 320 is requesting to share the wireless data service.

The controller 326 of the second terminal 320 searches for at least one terminal accessible the cellular network 340. The second terminal 320 may or may not include the wireless modem 322 and use the wireless data service through the cellular network 340. If the second terminal 320 includes the wireless modem 322 accessible the wireless data service through the cellular network 340, the second terminal 320 may periodically query a server of a service provider about an amount of remaining wireless data service, i.e., service data remaining packets while using the wireless data service. The available wireless data service remaining amount information indicates a physical amount of remaining data packets available without an additional charge, excluding an amount of currently used data packets, with respect to a fixed billing rate of the wireless data service available by the first terminal 310 or the second terminal 320 through the cellular network 340.

The available wireless data service remaining amount information indicates a time available without an additional charge, excluding a currently used time, with respect to the fixed billing rate of the wireless data service available by the first terminal 310 or the second terminal 320 through the cellular network 340. If an amount of currently used data exceeds the limit of a fixed billing rate, the controller 326 of the second terminal 320 stops using the wireless data service. Thereafter, the controller 326 of the second terminal 320 searches for terminals including wireless modems accessible the cellular network 340. For example, the controller 326 of the second terminal 320 searches for mobile devices including wireless modems that are regarded as having no speed problem for access to the Internet based on an RSSI receipt intensity. Thereafter, the controller 326 of the second terminal 320 requests for the available wireless data service remaining amount information from the found terminal. That is, the second terminal 320 requests for an inquiry of remaining data packets accessible the wireless data service from the found terminal.

The controller 326 of the second terminal 320 receives the available wireless data service remaining amount information from the found terminal, and determines the first terminal 310 to request for sharing the wireless data service based on the received available wireless data service remaining amount information. In the first embodiment, the controller 326 of the second terminal 320 determines a terminal having the greatest amount of remaining wireless data service as the first terminal 310, and the controller 326 of the second terminal 320 transmits a wireless data service share request to the first terminal 310. That is, the controller 326 of the second terminal 320 transmits a request to use the data service provided by the cellular network 340 through the wireless modem 312 of the first terminal 310 to the first terminal 310. Thereafter, the controller 316 of the first terminal 310 transmits a response (permission) to the wireless data service share request to the second terminal 320.

If the second terminal 320 receives the response to the wireless data service share request from the controller 316 of the first terminal 310, the first terminal 310 and the second terminal 320 are connected through a wireless LAN 330 through the wireless LAN network adaptor 314 of the first terminal 310 and the wireless LAN network adapter 324 of the second terminal 320 and maintain communication therebetween. The wireless LAN 330 is used to access the Internet within a distance from an AP, and may be Wi-Fi. However, connection between the first terminal and the second terminal is not limited to the wireless LAN. The first terminal 310 and the second terminal 320 may maintain connection and communicate data therebetween.

The controller 326 of the second terminal 320 transmits a data request signal to the controller 316 of the first terminal 310 through the wireless LAN network adapter 324 of the second terminal 320. Thereafter, the controller 316 of the first terminal 310 receives data requested by using the wireless data service of the cellular network 340 through the wireless modem 312 of the first terminal 310. The controller 316 of the first terminal 310 then transmits the received data to the wireless LAN network adapter 324 of the second terminal 320 through the wireless LAN network adaptor 314 of the first terminal 310.

If the first terminal 310 completely consumes the amount of remaining wireless data service by sharing the wireless data service, the controller 326 of the second terminal 320 requests a terminal having the greatest amount of remaining wireless data service to share the wireless data service, except the first terminal 310, among the found terminals.

According to the second embodiment, the controller 326 of the second terminal 320 transmits the wireless data service share request including the wireless data service remaining amount information request to the first terminal 310. Thereafter, the wireless modem 312 of the first terminal 310 requests for available wireless data service remaining amount information from a server existing in the cellular network 340. If the available wireless data service remains in the first terminal 310, the controller 316 of the first terminal 310 transmits the response to the wireless data service share request to the second terminal 320. Then, the first terminal 310 and the second terminal 320 are connected through the wireless LAN and maintain communication therebetween, and the first terminal 310 and the second terminal 320 share the wireless data service.

Figure 4:
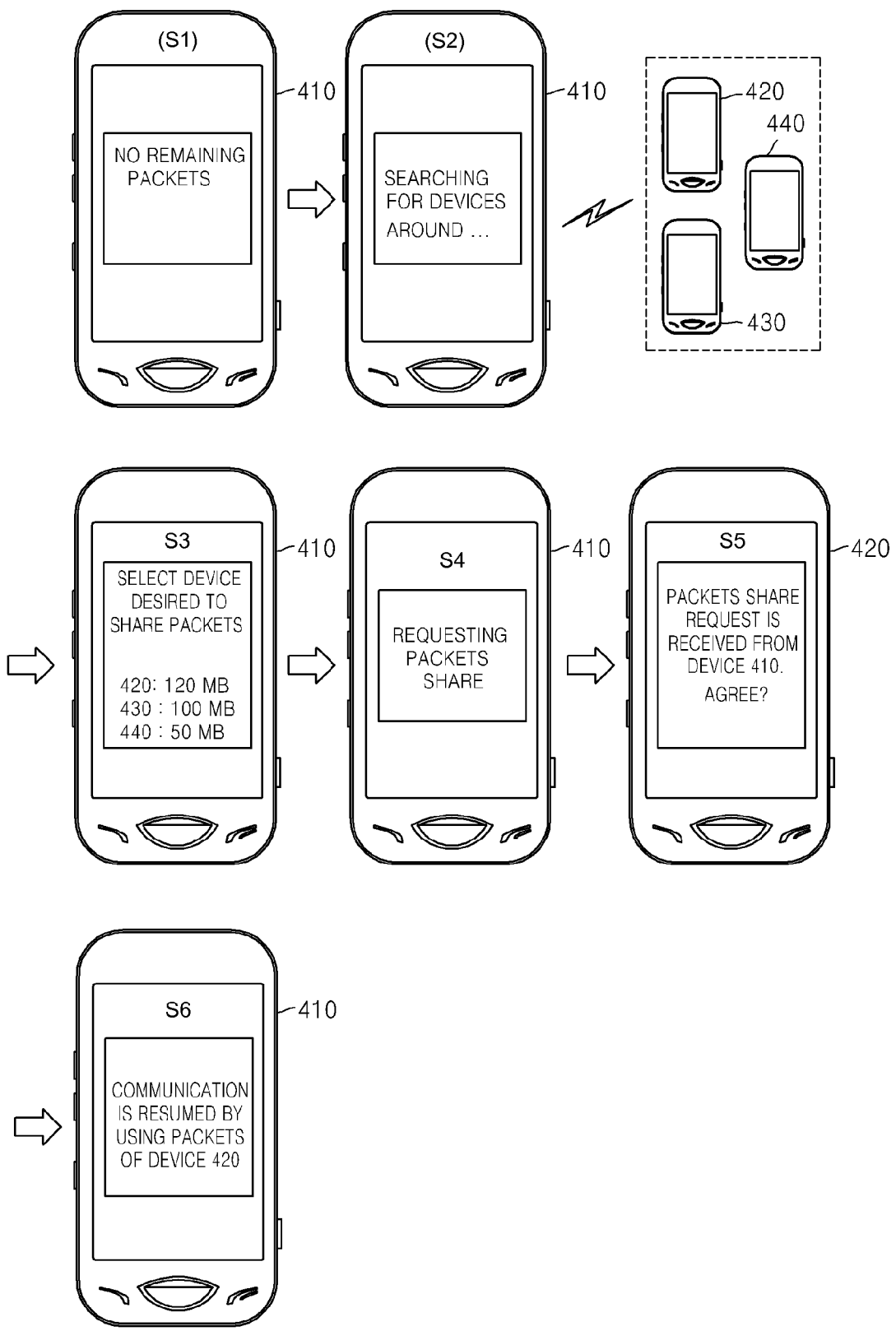
FIG. 4 illustrates a scenario according to the present invention.

FIG. 4 illustrates a scenario according to the present invention.

Referring to FIG. 4, if a mobile device 410 of a user has no remaining data packet accessible a wireless data service through a cellular network in step S1, the mobile device 410 of the user searches for devices 420, 430, and 440 in step S2. The mobile device 410 of the user requests for an amount of remaining data packets from the devices 420, 430, and 440. Thereafter, the mobile device 410 of the user displays the amount of remaining data packets of the devices 420, 430, and 440. For example, if the devices 420, 430, and 440 have remaining data packets of 120 MB, 100 MB, and 50 MB, respectively, as shown in step S3, the user requests the device 420 having the greatest amount of remaining data packets to share data packets in step S4. If a user of the device 420 accepts the data packet share request in step S5, the mobile device 410 of the user resumes using the wireless data service through the cellular network by using packets of the device 420 in step S6.

The invention can also be embodied as computer-readable codes on a computer-readable recording medium. The computer-readable recording medium is any data storage device that can store data which can be thereafter read by a computer system. Examples of the computer-readable recording medium include Read-Only Memory (ROM), Random-Access Memory (RAM), CD-ROMs, magnetic tapes, floppy disks, and optical data storage devices. The computer-readable recording medium can also be distributed through network-coupled computer systems so that the computer-readable code is stored and executed in a distributed fashion. Also, functional programs, codes, and code segments for accomplishing the present invention can be easily construed by programmers of ordinary skill in the art, to which the present invention pertains.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of sharing a wireless data service, the method comprising:
   requesting, by a second terminal, available wireless data service remaining amount information from at least one terminal through which a cellular network is accessible, the available wireless data service remaining amount information indicating an amount of remaining data without an additional charge;
   determining, by the second terminal, a first terminal to request for sharing the wireless data service based on the available wireless data service remaining amount information;
   transmitting, by the second terminal, a wireless data service share request to the first terminal based on the available wireless data service remaining amount information received from the first terminal;
   receiving, by the second terminal, data that the first terminal receives through the cellular network; and
   when the first terminal completely consumes the available wireless data service remaining amount, transmitting, by the second terminal, the wireless data service share request to a terminal among the at least one terminal excluding the first terminal.

2. The method of claim 1, wherein the determining comprises:
   determining, by the second terminal, a terminal having a greatest available wireless data service remaining amount as the first terminal, among the at least one terminal that transmits the available wireless data service remaining amount information.

3. The method of claim 1, wherein the first terminal and the second terminal are connected through a wireless Local Area Network (LAN).

4. The method of claim 1, wherein the wireless data service remaining amount is a physical data amount received by the first terminal from the server existing in the cellular network, or is a time available by the first terminal accessible the cellular network.

5. An second terminal for requesting a wireless data service, the second terminal comprising:
   a communicator; and
   a controller configured to request available wireless data service remaining amount information from at least one terminal through which a cellular network is accessible,
   wherein the available wireless data service remaining amount information indicates an amount of remaining data without an additional charge,
   wherein the controller determines a first terminal to request sharing of wireless data service based on the available wireless data service remaining amount information,
   wherein the communicator is configured to transmit a wireless data service share request to the first terminal based on the available wireless data service remaining amount information received from the first terminal, and the second terminal receives data that the first terminal receives through the cellular network, and
   wherein, when the first terminal completely consumes the available wireless data service remaining amount, the communicator transmits the wireless data service share request to a terminal among the at least one terminal excluding the first terminal.

6. The second terminal of claim 5, wherein the controller requests a terminal having a greatest available wireless data service remaining amount among the at least one terminal that transmits the available wireless data service remaining amount information to share the wireless data service.

7. The second terminal of claim 5, wherein the communicator comprises a wireless LAN network adapter, and wherein the wireless LAN network adapter connect the determined first terminal to a wireless LAN.

8. The second terminal of claim 5, wherein the wireless data service remaining amount is a physical data amount received from the server existing in the accessible cellular network is a time accessible the cellular network.

* * * * *